(12) United States Patent
Habermann et al.

(10) Patent No.: US 11,506,616 B2
(45) Date of Patent: Nov. 22, 2022

(54) INSPECTION SYSTEM FOR INSPECTION OF A LATERAL SURFACE OF A THREE-DIMENSIONAL TEST OBJECT

(71) Applicant: Mühlbauer GmbH & Co. KG, Roding (DE)

(72) Inventors: Oliver Habermann, Lugau (DE); Bertram Burkhardt, Dortmund (DE); Ulf Porth, Huckeswagen (DE)

(73) Assignee: Mühlbauer GmbH & Co. KG, Roding (DE)

( * ) Notice: Subject to any disclaimer, the term of this patent is extended or adjusted under 35 U.S.C. 154(b) by 114 days.

(21) Appl. No.: 17/273,424

(22) PCT Filed: Sep. 3, 2019

(86) PCT No.: PCT/EP2019/073489
§ 371 (c)(1),
(2) Date: Mar. 4, 2021

(87) PCT Pub. No.: WO2020/049002
PCT Pub. Date: Mar. 12, 2020

(65) Prior Publication Data
US 2021/0190482 A1 Jun. 24, 2021

(30) Foreign Application Priority Data
Sep. 4, 2018 (DE) .......................... 102018121573.8

(51) Int. Cl.
*G01N 21/90* (2006.01)
*G01B 11/30* (2006.01)
*G01B 9/0209* (2022.01)

(52) U.S. Cl.
CPC ......... *G01N 21/909* (2013.01); *G01B 9/0209* (2013.01); *G01B 11/303* (2013.01); *G01N 2201/0423* (2013.01); *G01N 2201/1047* (2013.01)

(58) Field of Classification Search
CPC ... G01N 2201/0423; G01N 2201/1047; G01B 11/303; G01B 11/24
USPC ...................................................... 356/239.4
See application file for complete search history.

(56) References Cited

U.S. PATENT DOCUMENTS

| 2,593,127 A | 4/1952 | Fedorchak |
| 10,845,316 B2 * | 11/2020 | Pinto .................... G01B 11/272 |

FOREIGN PATENT DOCUMENTS

| CN | 101403706 B * | 6/2011 | ............. G01B 11/08 |
| DE | 3704381 A1 | 8/1988 | |
| DE | 19511854 A1 | 2/1996 | |
| DE | 102010032410 B4 | 11/2014 | |

(Continued)

*Primary Examiner* — Michael A Lyons
(74) *Attorney, Agent, or Firm* — Wood Herron & Evans LLP

(57) ABSTRACT

An inspection system is provided for the inspection of a lateral surface of a three-dimensional test object. The inspection system includes a conveying structure; (ii) a facet mirror; and (iii) an optical inspection device. In this context, the inspection system is arranged to rotate the conveying structure and the facet mirror in a coordinated manner and in opposite directions of rotation in such a way that each of a plurality of object carriers, as they pass through an inspection area, is imaged onto the inspection device by exactly one of the facets of the facet mirror. A corresponding method for inspection is also provided.

20 Claims, 6 Drawing Sheets

(56) References Cited

FOREIGN PATENT DOCUMENTS

| | | | | | |
|---|---|---|---|---|---|
| EP | 1574817 | A1 | * | 9/2005 | ............. G01B 11/24 |
| GB | 2292605 | A | * | 2/1996 | ............. G01B 11/08 |
| JP | S535686 | A | | 1/1978 | |
| JP | S62263449 | A | | 11/1987 | |

* cited by examiner though an inspection area through which passes a path section of the path curve of the object carriers which is defined by the rotation of the conveying structure; (ii) a facet mirror which is supported so as to be rotatable about a second axis of rotation, on the circumference of which facet mirror a number of M facets are provided, each of which is constructed as a mirror element, so that the mirror elements are lined up at least along a circumferential strip along the circumference of the facet mirror; and (iii) an optical inspection device which is aligned with respect to the facet mirror in such a way that the inspection area is optically imaged by the facet mirror onto the inspection device. In this context, the inspection system is arranged to rotate the conveying structure and the facet mirror in a coordinated manner and in opposite directions of rotation in such a way that each of the object carriers, as they pass through the inspection area, are imaged onto the inspection device by exactly one of the facets.

INSPECTION SYSTEM FOR INSPECTION OF A LATERAL SURFACE OF A THREE-DIMENSIONAL TEST OBJECT

CROSS-REFERENCE TO RELATED APPLICATIONS

This application is a national phase entry of, and claims priority to, International Application No. PCT/EP2019/073489, filed Sep. 3, 2019, which claims priority to German Patent Application No. 10 2018 121 573.8, filed Sep. 4, 2018. The above-mentioned patent applications are incorporated herein by reference in their entireties.

TECHNICAL FIELD

This application relates to an inspection system and a method for the inspection of a lateral surface of a three-dimensional test object, in particular a printed image produced on or at the lateral surface, as well as a use of such an inspection system.

BACKGROUND

The test object can be a hollow body, such as for example a cup or a bottle or other type of vessel. In addition, without this being intended to be understood as a limitation, the test object can have a point symmetry or an axis symmetry, in particular a rotational symmetry.

In a number of different applications, it may be necessary to subject three-dimensional objects, in particular hollow bodies, which have been produced previously, to an optical inspection after they have been manufactured or after a surface treatment, in particular printing, has been applied to them. This can be the case, for example, when printing is applied to bottles or other containers, or when they are provided with a sticker or a label, and the result of this process step is subsequently to be examined by an optical inspection of the three-dimensional objects, which herein are then referred to as "test objects".

In some known solutions, a conveyor is used to move a plurality of test objects on a circular path through an inspection area. In this context, each of the test objects, while they are in the inspection area, is optically imaged by fixed mirrors onto an inspection device, in particular a camera, with the aid of which an optical inspection of the respective test object, i.e. of its lateral surface, above all, is carried out.

Often, such an inspection of the test objects must be carried out very quickly, so that only a very small amount of time is available for the inspection of an individual test object, and a large number of such test objects have to be inspected efficiently in a short period of time.

It would thus be desirable to further improve the inspection of three-dimensional test objects. In particular, it is desirable to achieve a high throughput of test objects, i.e. a high process speed.

SUMMARY

To address these and other problems with the conventional designs, an inspection system is provided. A first embodiment of the invention relates to an inspection system for the inspection of a lateral surface of a three-dimensional test object, in particular a printed image produced on or at the lateral surface. The inspection system comprises: (i) a conveying structure which is supported so as to be rotatable about a first axis of rotation, the conveying structure having a plurality of N object carriers, each of which is configured as a holder for a test object to be inspected. In this regard, the conveying structure is configured, during its rotation, to sequentially move the object carriers through an inspection area through which passes a path section of the path curve of the object carriers which is defined by the rotation of the conveying structure; (ii) a facet mirror which is supported so as to be rotatable about a second axis of rotation, on the circumference of which facet mirror a number of M facets are provided, each of which is constructed as a mirror element, so that the mirror elements are lined up at least along a circumferential strip along the circumference of the facet mirror; and (iii) an optical inspection device which is aligned with respect to the facet mirror in such a way that the inspection area is optically imaged by the facet mirror onto the inspection device. In this context, the inspection system is arranged to rotate the conveying structure and the facet mirror in a coordinated manner and in opposite directions of rotation in such a way that each of the object carriers, as they pass through the inspection area, are imaged onto the inspection device by exactly one of the facets.

In the sense of the invention, a "lateral surface" of a three-dimensional test object is intended to be understood to mean that portion of the surface of a test object which is present in addition to any base surface and/or top surface that may be present. Any base or top surfaces extending perpendicular to the axis of rotation are therefore, if present, not counted as part of the lateral surface. In this context, the test object can exhibit a rotational symmetry, as would for example be the case with a cylinder or a cone. However, it is not necessary for the test object to exhibit any symmetry, in particular no rotational symmetry. In particular, the lateral surface can also be composed of several partial surfaces (side surfaces) (in this way, for example, in the case of a pyramid shape, the triangular side surfaces that converge at the apex which is located opposite the base surface of the pyramid, which base surface is not part of the lateral surface, together form the lateral surface of the pyramid, and, for example, in the case of a rectangle, its side surfaces that are not perpendicular to the axis of rotation).

In the sense of the invention, a "conveying structure" is intended to be understood to mean a body which is set up to convey one or more test objects along a defined path curve. Without this being intended as a limitation, the conveying structure may in particular assume the form of a body of rotation, in particular a wheel-shaped body (in the following: "object carrier wheel").

In the sense of the invention, an "object carrier" is intended to be understood to mean a corporeal structure which is set up to hold at least one test object to be inspected in the sense of a holding facility, in particular a mechanical or a magnetic holding facility and/or a holding facility constructed in a different manner, in particular in such a way that the test object is moved, together with the object carrier, at least substantially along the path curve of the latter, during rotation of the conveying structure on which the object carrier is provided.

The terms "rotation" or "rotate" or "rotatable" etc. refer, in each case, to a rotation of a body about itself (spin), which is to be distinguished from a rotational movement of the body along a path curve, which may also occur in addition to this, or without rotation of the body.

In the sense of the invention, a "facet mirror" is intended to be understood to mean a corporeal structure, preferably a point-symmetrical or rotationally symmetrical corporeal structure, in particular a cylindrical corporeal structure, on the circumference of which M>1 individual partial surfaces ("facets" or "segments", as they are referred to), each constructed as a mirror element, are provided, so that the mirror elements are lined up at least along a strip extending circumferentially along the circumference of the facet mirror. In particular, the individual mirror elements may together form a tessellation of the strip. In this context, the facets can be fully mirrored, at least along a direction which corresponds to the running direction of the strip mentioned above. Alternatively, however, a partial mirroring is also conceivable, as long as it is ensured, as part of this, that each of the object carriers is imaged onto the inspection device by exactly one of the facets during its passage through the inspection area.

In the sense of the invention, an "inspection area" is intended to be understood to mean a spatial region along the path curve of the object carriers during their rotation due to the rotation of the conveying structure, in which an optical imaging of the test objects held by the object carriers is carried out, onto the inspection device and for the purpose of the at least partial optical inspection of the lateral surface of the test objects, by the facet mirror. The inspection area thus corresponds to, or includes, a spatial region through which an object carrier or a test object held by the latter passes during a fraction of 1/N of a rotation of the conveying structure along its path curve (cf. the example area indicated by hatching in FIG. 1).

In the sense of the invention, the terms "configured" or "set up" are intended to be understood in such a way that the device under consideration is already set up or can be set up—i.e. can be configured—to fulfil a particular function. In this context, the configuration can be carried out, for example, by a corresponding setting of parameters of a process sequence or of switches or the like for activating or deactivating functionalities or settings. In particular, the device may have a plurality of predetermined configurations or modes of operation, so that the configuring can be carried out by a selection of one of these configurations or modes of operation.

In an inspection system according to the first embodiment of the invention, test objects can be inspected with a high throughput in a short period of time while they are being moved by the conveying structure, without there being a need to stop the conveying structure for the inspection process. In particular, the inspection device can remain in the same place and can remain stationary during this process, as a result of which the quality of the inspection can be improved when compared to solutions where it must be moved, such as in the case of a tracking camera. The fact that the rotations of the conveying structure and the facet mirror take place in a coordinated manner, in particular in a synchronous manner, makes it possible to make the optical inspection of a test object extend over the entire path section of its path curve which runs in the inspection area, which also makes it possible to inspect the test object from different viewing angles, even if the object itself does not rotate.

In the following, certain preferred embodiments of the inspection system in accordance with the invention will be described, each of which, as far as this is not expressly excluded or technically impossible, can be combined in any desired manner with one another, as well as with the other embodiments of the invention which are described below.

According to embodiments which are alternative to one another, the inspection system is set up to rotate the conveying structure and the facet mirror in a coordinated manner and in opposite directions of rotation in such a way that one of the following conditions applies:

(a) N=M, and the rotational speed of the facet mirror, at least substantially, corresponds to that of the conveying structure;

(b) N>M, and the rotational speed of the facet mirror is smaller than that of the conveying structure;

(c) N<M, and the rotational speed of the facet mirror is greater than that of the conveying structure.

In some embodiments, at least one of the object carriers is set up to hold a test object in such a way that the test object can perform a rotation at the same time. In this way, it is made possible for the test object, in particular when it passes through the inspection area, to perform a rotation, as a result of which, when compared to the case without rotation, a larger area of its surface can be inspected during the same period of time. In particular, if the period of the rotation is longer than the time that it takes the test object to pass through the inspection area, an inspection of the test object from all sides can thus be performed.

In particular, in some of these embodiments, the at least one object carrier may be set up to cause the test object held by it to rotate during the rotation of the conveying structure at a rotational speed that is greater than, or equal to, a fraction of 1/M of the rotational speed of the facet mirror. In this way, the rotation can be actively caused by the object carrier and, in particular, the inspection of the test object from all sides mentioned above can be carried out, since the fraction of 1/M of the rotational speed of the facet mirror corresponds to the time that it takes the test object to pass through the inspection area and, in the process, the test object held by the object carrier is continuously imaged onto the inspection device by a single respective facet of the facet mirror.

In some embodiments, at least one of the object carriers is constructed as a holder for a test object constructed as a hollow body, in particular as a bottle or as a cup. For this purpose, the object carrier may have a holding mandrel for a hollow body. In this way, the inspection system is suitable for inspecting printing on, or labels of, vessels, such as bottles or cups, whereby such a vessel or hollow body, in the case that a holding mandrel is used, can be placed on the latter in such a way that the holding mandrel is inserted into the vessel or the hollow body through an opening thereof and thus at the same time forms an axis of rotation for its rotation. In particular, the holding mandrel can have a cylindrical form and can optionally also be tapered towards its distal end, and can have a pointed or a rounded shape.

In some embodiments or variants, the maximum radius of the conveying structure in relation to the first axis of rotation is smaller than the smallest distance between the first axis of rotation and the circumference of the facet mirror. In particular, this makes it possible for the conveying structure and the facet mirror to be arranged laterally adjacent to each other so that the inspection of the test objects is carried out from outside the conveying structure. Alternatively, other variants are also conceivable in which the smallest distance between the first axis of rotation and the circumference of the facet mirror of the facet mirrors is smaller than the maximum radius of the conveying structure in relation to the first axis of rotation, in which case the facet mirror is arranged in such a way that it images the test objects onto the inspection device from the inside of their path curve as they pass through the inspection area. The latter variants enable a particularly compact design of the inspection device to be achieved.

In some embodiments, the first and the second axes of rotation are at least substantially parallel to each other. In this way, the shape of the facet mirror can be chosen to be particularly simple, in particular rotationally symmetrical, since the surfaces of the individual facets can run completely parallel to the second axis of rotation of the facet mirror, and no axes of rotation running in different directions need to be taken into account in the optical imaging, by the facet mirror, of the test objects onto the inspection device.

In some embodiments, each of the mirror elements covers an equally large angular portion of the circumference of the facet mirror along the strip. This enables a particularly regular geometry of the facet mirror to be achieved, and it also allows an inspection duration of the same length and, in particular, of a maximum length for each of the test objects without there being a need to variably adjust the speeds of rotation of the conveying structure or of the facet mirror.

In some embodiments, at least one of the object carriers is arranged on the conveying structure so as to be movable in a radial direction and, at the same time, is subjected, at least in a path section along this radial direction, to a force which, as viewed from the first axis of rotation, acts outwardly in the radial direction. In this way, the object carriers are attached to the conveying structure with a certain degree of flexibility and can thus yield to force components acting on the axis of rotation from outside in the radial direction and return to their normal position or their initial position on their own when the force ceases to act.

This is advantageous in those embodiments of the inspection system in which all of the object carriers are arranged on the conveying structure so as to be movable in the radial direction and where the inspection system further comprises a manipulation device which is configured to manipulate the path curve of each object carrier, as the latter passes through the inspection area of the path curve, by temporarily changing the radial position of the object carrier on the conveying structure in such a way that, in the inspection area, the variation of the distance of the object carrier from the axis of rotation of the facet mirror is at least less than in the case of a purely circular path curve of the object carrier, or is absent. This can be used advantageously for improving the optical imaging of the test object onto the inspection device by the facet mirror, since the optical blurring of the image associated with the variation of the distance can thus be reduced or even eliminated, which improves the quality of the inspection. In particular, in this way, depending on the requirements in terms of quality, an optical autofocus device can be dispensed with, if applicable. The manipulation device can be constructed as a stationary or, respectively, rotatable wheel, roller or drum.

In addition, the manipulation device can also be set up to cause test objects held on the object carriers to rotate. In this way, the manipulation device, in particular if it is constructed as a wheel, can be used at the same time for a further purpose, i.e. for actuating the test objects in order to cause them to rotate, as a result of which a particularly efficient solution can be achieved. In particular, the manipulation device can be rotatably driven for this purpose. In this context, respective drives of the conveying structure and of the manipulation device can advantageously be configured in such a way that they can set the conveying structure and the manipulation device, respectively, into a rotation in which the circumferential speed of the manipulation device is higher than that of the conveying structure. In this way, the manipulation device can, due to the relative speed of its circumference which arises with respect to the circumference of the conveying structure, which is also rotating, cause each of the test objects rotatably mounted on the object carriers to rotate, in particular before and/or while each of them respectively passes through the inspection area. In particular, the manipulation device can be coupled to the conveying structure and/or to the facet mirror in terms of it being driven, whereby a higher rotational speed of the manipulation device can be realized by a suitable transmission.

In some embodiments, the manipulation device is further provided with a driven belt, which may be a toothed belt or a flat belt. It is arranged next to the conveying structure in such a way that it can simultaneously engage at least two test objects which are held on respective object carriers outside the inspection area of the path curve and can cause them to rotate before they reach the inspection area on their way along the path curve defined by the rotation of the conveying structure. In this way, several of the test objects can be set in rotation simultaneously in an efficient manner.

In some embodiments, the optical inspection device comprises a line scan camera, the scan line of which is, at least substantially, parallel to the axis of rotation of the facet mirror. In this way, the test objects are imaged onto the line scan camera via a corresponding facet of the facet mirror as they pass through the inspection area, whereby they are optically "scanned" in a continuous manner so that an overall image of the scanned surface of the respective test object is obtained by putting together the line type scan images of the line scan camera. In this way, an inspection of the test objects can be carried out in an efficient manner even through the use of a simple line scan camera. Additionally, due to the one-dimensional nature (line) of the images, avoiding imaging errors, as they would typically be expected with a two-dimensional image, is made possible in a simple manner.

In some embodiments, the inspection device has an autofocus function, in particular in addition to, or as an alternative to, a manipulation device. This can be used in order to further improve the quality of the optical imaging of the test objects onto the inspection device, in particular in order to reduce or even avoid any remaining blurring in the imaging.

In some embodiments, the inspection system further comprises an illumination device which is configured to indirectly illuminate the inspection area, or at least portions thereof, by irradiation of the facet mirror. The illumination device can comprise a plurality of individual light sources, which can be used to achieve the most homogeneous and isotropic illumination possible of the inspection area, i.e. also of the surface portions of the test objects therein, which surface portions face towards the facet mirror, for the inspection from different viewing directions. In the case of multiple light sources, these are preferably arranged on both sides of the inspection device for the aforementioned purpose of achieving the most uniform illumination possible.

In particular, in some of these embodiments, at least one of the mirror elements of the facet mirror may have two mirror portions which are arranged at an angle to each other, whereby one of the mirror portions is oriented in such a way that, when it is illuminated by the illumination device, it reflects its light at least partially into the inspection area, while the other mirror portion is oriented in such a way that it images the inspection area by reflection at least partially onto the inspection device. In this way, the facet mirror can perform two functions in an efficient manner at the same time, i.e. on the one hand, to illuminate the inspection area in cooperation with the illumination device, and, on the other hand, to optically image the inspection area, in particular a test object located therein, onto the inspection device.

In some embodiments, the number N and/or the number M is selected from the integer range [20, . . . , 30], in particular equal to 24. It has been found that this range for N and/or M is particularly appropriate in order to achieve, on the one hand, a compact construction of the inspection system and at the same time, on the other hand, the highest possible throughput. In particular, throughputs of over 1000 test objects per minute can be achieved in this way, for example at a rotational speed of the conveying structure of 50 rotations per minute.

A second embodiment of the invention relates to the use of an inspection system according to the first embodiment of the invention, for the inspection of a respective lateral surface of one or more three-dimensional test objects, in particular of a printed image produced on or at the lateral surface of the respective test object.

A third embodiment of the invention relates to a method for the inspection of a lateral surface of a three-dimensional test object, in particular a printed image produced on or at the lateral surface. The method comprises: (i) rotating a conveying structure which is supported so as to be rotatable about a first axis of rotation, the conveying structure having a plurality of N object carriers, each of which is configured as a holder for a test object to be inspected, such that the object carriers are sequentially moved through an inspection area through which passes a path section of the path curve of the object carriers which is defined by the rotation of the conveying structure; (ii) rotating a facet mirror which is supported so as to be rotatable about a second axis of rotation, on the circumference of which facet mirror a number of M facets are provided, each of which is constructed as a mirror element, so that the mirror elements are lined up at least along a circumferential strip along the circumference of the facet mirror; and (iii) inspecting, by an optical inspection device (5), a test object which is located on a corresponding object carrier in the inspection area, which optical inspection device (5) is aligned with respect to the facet mirror in such a way that the inspection area is optically imaged by the latter onto the inspection device. In this context, the rotating of the conveying structure and the rotating of the facet mirror are carried out in a coordinated manner and in opposite directions of rotation in such a way that each of the object carriers, as they pass through the inspection area, are imaged onto the inspection device by exactly one of the facets.

The features and advantages which have been explained in relation to the different embodiments can include any combinations of the described embodiments.

BRIEF DESCRIPTION OF THE DRAWINGS

Further advantages, features and possible applications of the present invention will be apparent from the following detailed description in connection with the drawings. The accompanying drawings, which are incorporated in and constitute a part of this specification, illustrate one or more embodiments of the invention and, together with the general description given above and the detailed description given below, explain the one or more embodiments of the invention.

DETAILED DESCRIPTION

Figure 1:
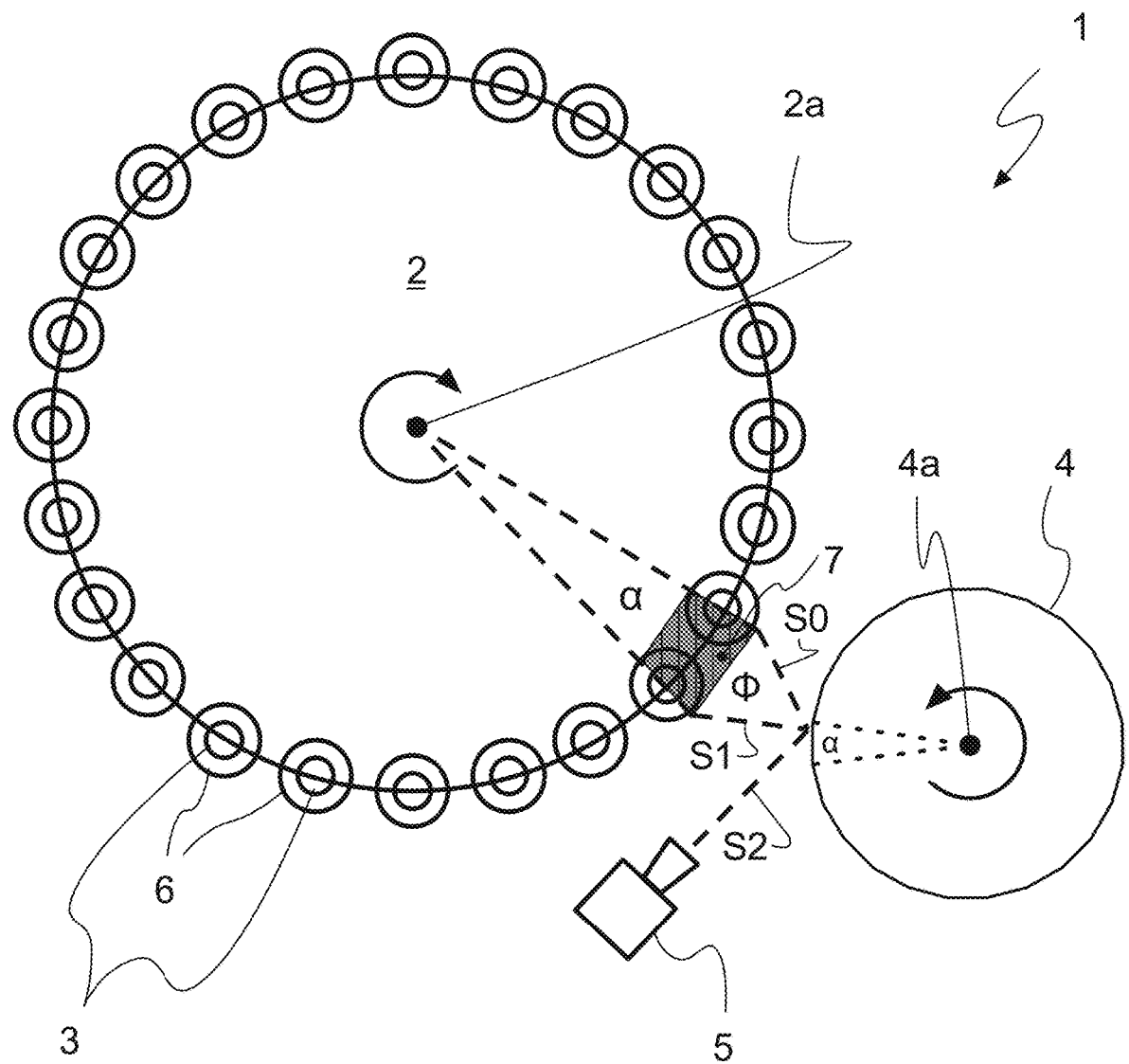
FIG. 1 is a schematic view of an inspection system in accordance with a first preferred embodiment.

The inspection system 1 shown in FIG. 1, in accordance with a first embodiment, is set up for the inspection of a lateral surface 6a of a three-dimensional test object 6, in particular a printed image produced on or at the lateral surface 6a. It comprises a conveying structure 2 in the form of an object carrier wheel, which is mounted so as to be rotatable about a central axis of rotation 2a (here: at the same time an axis of symmetry) and which has a corresponding drive (not shown) for causing the conveying structure 2 to perform such a rotation (i.e. a rotation about itself). While here and in the following the conveying structure 2 is shown in the form of an object carrier wheel, i.e. with an at least substantially circular contour, other shapes are of course also conceivable, so that this shape is in no way to be understood as a limitation. A plurality of N, in the present example with N=24, object carriers 3 are formed on the circumference of the conveying structure 2, each of which is configured as a holder for a test object 6 to be inspected. The test object 6 can be a hollow body, such as a bottle, a can or a cup, for example. At least one of the object carriers 3 can be constructed as a holding mandrel, in particular as a holding mandrel which is oriented in a direction parallel to the axis of rotation 2a, for a test object 6 constructed as a hollow body, or may have such a mandrel. Other forms of object carriers 3 are also possible, in particular also ones with a cavity for receiving a test object 6.

The object carriers are arranged uniformly, i.e. equidistantly, along the circumference of the conveying structure 2, so that the positions of two adjacent object carriers, together with the axis of rotation 2a, define an angle α with respect to the latter, which is equal to a fraction of 1/N of 360°. With N=24, as in the present example, we accordingly obtain α=15°. The conveying structure is thus set up to move, during its rotation, the object carriers 3 sequentially through an inspection area 7 (shown hatched), through which passes a path section of the path curve of the object carriers 3 defined by the rotation of the conveying structure 2 and which corresponds to the angle α or is defined by the latter as regards its extent along the path curve of the object carriers 3.

Figure 5A:
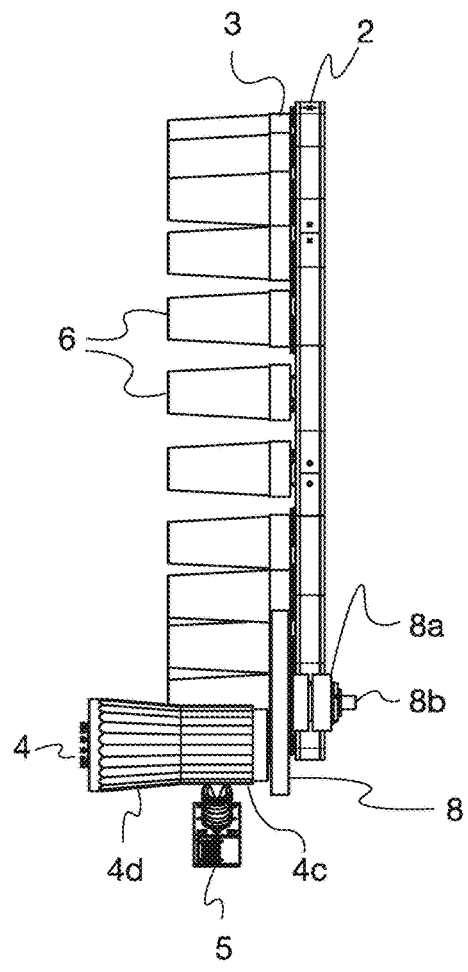
FIG. 5A is a side view of an inspection system in accordance with a fourth preferred embodiment, which is also derived from the second embodiment mentioned above, wherein in this fourth embodiment the facet mirror is additionally arranged to illuminate the inspection area on the conveying structure in cooperation with an illumination device.
Figure 5B:
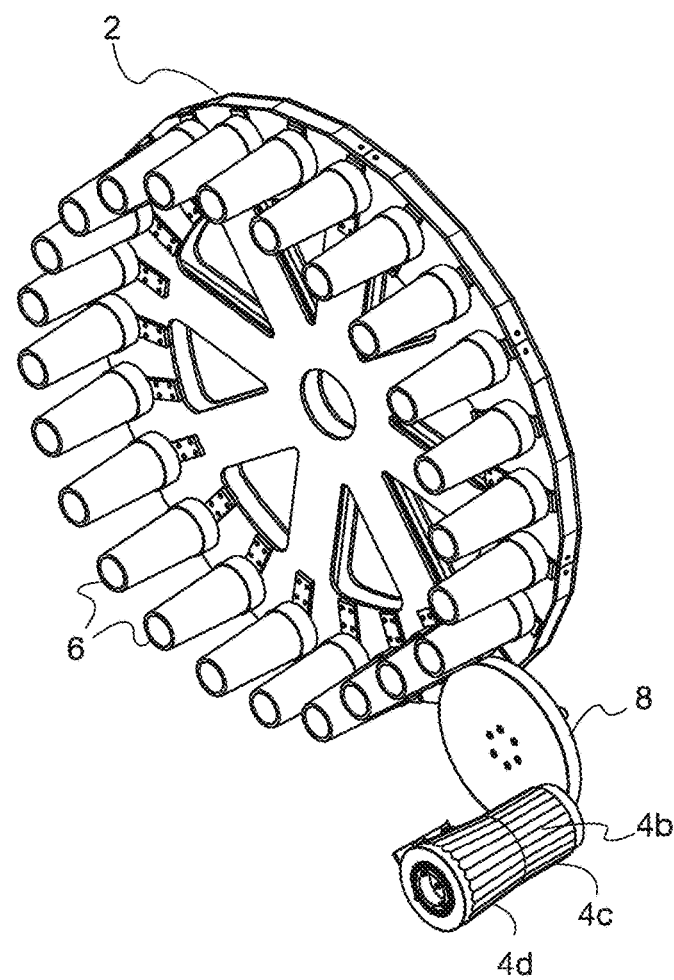
FIG. 5B is a perspective view of the inspection system of FIG. 5A.

A facet mirror 4 is arranged next to the conveying structure 2 and laterally spaced from it, so that the maximum radius of the conveying structure 2 relative to the axis of rotation 2a is smaller than the smallest distance between the axis of rotation 2a and the circumference of the facet mirror 4. The facet mirror 4 is constructed so as to be at least substantially axisymmetric and is mounted and driven so as to be rotatable about its corresponding axis of symmetry 4a, which serves as the axis of rotation, in a direction of rotation which is opposite to the rotation of the conveying structure 2. In this context, the rotational movements of the conveying structure 2 and the facet mirror 4 are coordinated in such a way that they always have the same rotational speed (synchronous counter-rotation). On the circumference of the facet mirror 4, there are M=N=24 facets provided, which are each formed as a mirror element 4c (cf. FIGS. 5A and 5B), so that the mirror elements 4c are lined up at least along a circumferential strip along the circumference of the facet mirror 4. As part of this, each of the mirror elements 4c covers an equally large angular portion (which corresponds to the angle $\alpha$) of the circumference of the facet mirror.

Further, the inspection system 1 comprises an inspection device 5, which can be constructed as a line scan camera. The orientation of the "line" or "scan line", i.e. the line-shaped light-sensitive receiving surface, of such a line scan camera is preferably selected in such a way that it runs parallel to the axis of rotation 4a of the facet mirror 4. It is oriented and arranged relative to the conveying structure 2 and the facet mirror 4 in such a way that the inspection area 7 is optically imaged sequentially onto the stationary inspection device 5 during the coordinated rotation of the conveying structure 2 and the facet mirror 4. In the interest of a simplified illustration, in FIG. 1 this is shown in terms of geometric beam optics on the basis of, by way of example, the light beams S0 and S1, each of which correspond, respectively, to opposite ends of the inspection area 7 and which image these, together with all beams located therebetween (not shown) onto the inspection device 5 via the facet mirror 4 (light beam S2). The inspection system 1 is thus arranged to rotate the conveying structure 2 and the facet mirror 4 in a coordinated manner and in opposite directions of rotation in such a way that the rotational speed of the facet mirror corresponds, at least substantially, to that of the conveying structure 2 and that each of the object carriers is imaged onto the inspection device by exactly one of the facets while they pass through the inspection area 7. Preferably, and as shown in FIG. 1, the two axes of rotation 2a and 4a are at least substantially parallel to each other. Solutions are however also conceivable in which the two axes are inclined relative to one another, i.e. are angled with respect to one another, and in such a way that both axes continue to lie in the same plane and are only inclined with respect to one another within this plane.

Figure 2:
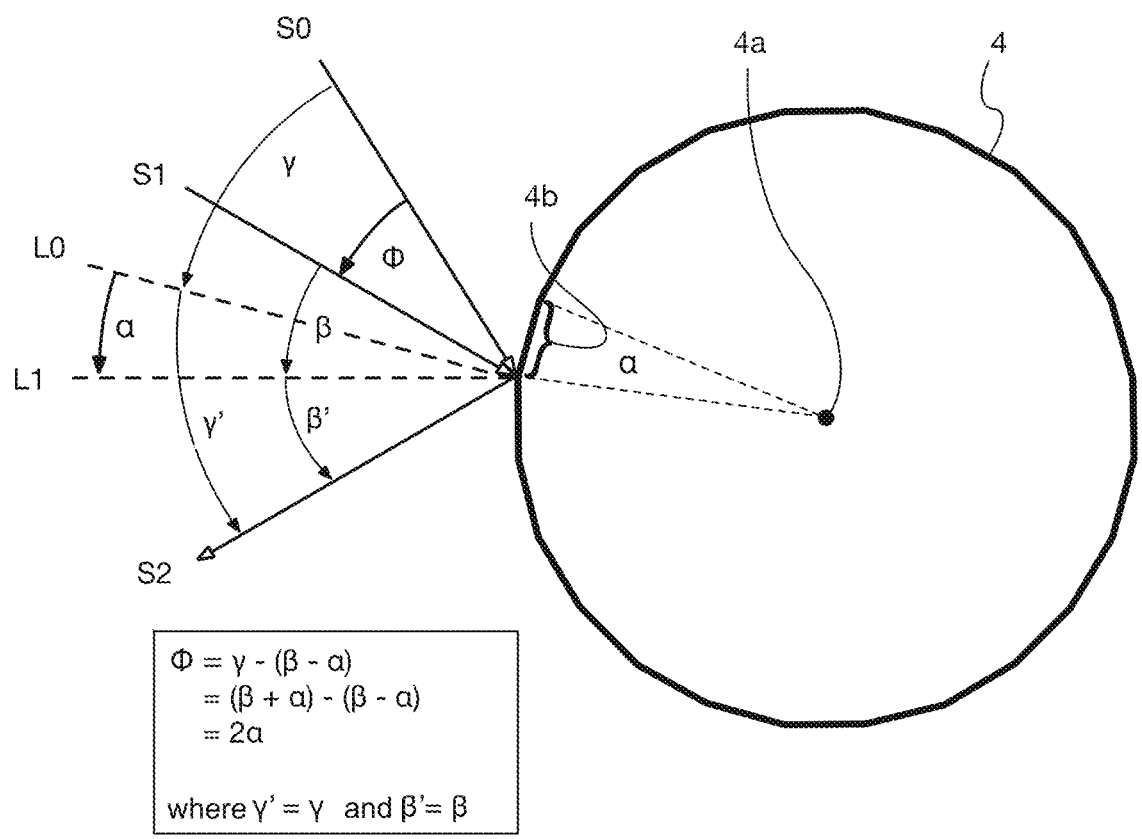
FIG. 2 is a detailed view of the facet mirror as well as the beam geometry with respect to the occurring light reflection, in accordance with various embodiments.

The two light beams S0 and S1 which are associated with the opposite ends of the inspection area 7 span an angle $\Phi$. Relating to this, FIG. 2 shows a detailed view of the rotatable facet mirror 4 in cross-section perpendicular to its axis of rotation 4a. Each of the facets of the facet mirror 4 represents a mirror element 4b. When the mirror element 4b indicated in FIG. 2 is rotated counterclockwise by an angle $\alpha$ about the axis of rotation 4a by the rotation of the facet mirror (about itself), the normal to this mirror element also passes through a corresponding angle $\alpha$ of the same size, whereby the normal L0 is transferred to the normal L1. At the beginning of this angular movement, the light beam S0 is optically imaged, by reflection on the mirror element 4b and in accordance with the law of reflection (angle of incidence $\gamma$=angle of reflection $\gamma'$), into the light beam S2, which is always oriented towards the fixed inspection device 5 (in particular its scan line or "line" for short). During the rotation of the facet mirror, in addition to the position of the normal to the mirror element, the direction of incidence of those light beams that are imaged onto the spatially constant light beam S2 and thus onto the inspection device 5 also changes accordingly, up to the light beam S1 to the normal L1, which is imaged according to the law of reflection (angle of incidence $\beta$=angle of reflection $\beta'$), whereby, here, the angle of reflection $\beta$ to the normal L1 is smaller than the angle $\gamma$ to the normal L0. Overall, therefore, the entire inspection area 7 is optically scanned during the coordinated rotation of the conveying structure 2 and the facet mirror 4, i.e. is imaged onto the inspection device 5 via the light beams S2 having an orientation which is constant over time. The short calculation, shown in FIG. 2, of the angle $\Phi$ which corresponds to the inspection area 7 shows that $\Phi$ is two times the angle of $\alpha=360°/M$ defined by the number M, i.e. $\Phi=2\alpha$.

Figure 3:
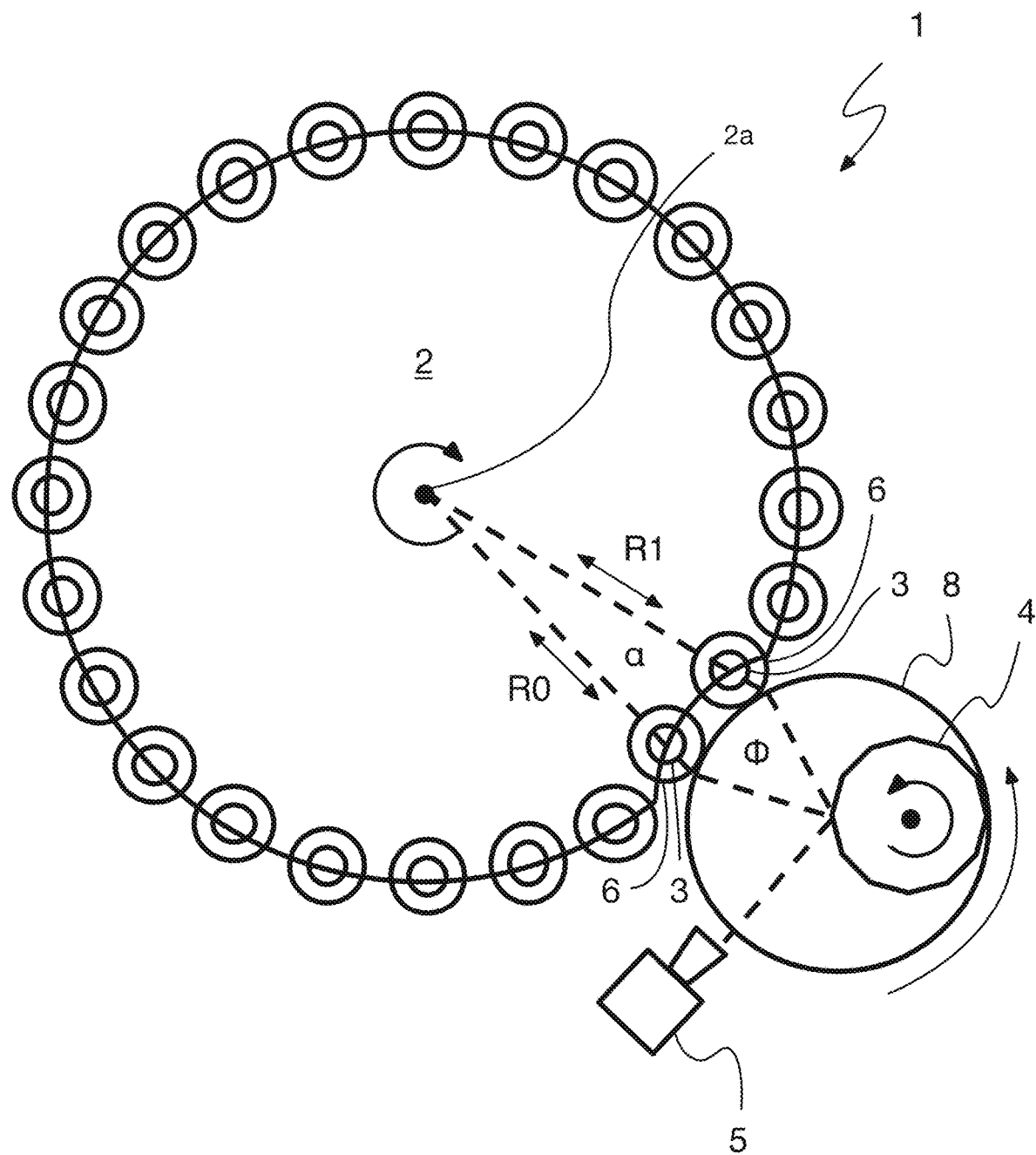
FIG. 3 is a schematic view of an inspection system in accordance with a second preferred embodiment, in which, when compared to the first embodiment, a manipulation device is additionally provided.

FIG. 3 illustrates a second preferred embodiment of the inspection system 1, which is derived from the first embodiment shown in FIG. 1 in that, additionally, (i) a manipulation device 8 is provided and (ii) the individual object carriers 3 are arranged so as to be movable in the radial direction (here, by way of example, for two adjacent object carriers 3 in the inspection area 7 marked as R0 and R1, respectively), with a restoring force acting outwardly in the radial direction, i.e. away from the axis of rotation 2a. This restoring force can be implemented by a spring mechanism (not shown). Each of the object carriers 3 is rotatably mounted so that it can cause a test object 6 held by it to perform a rotation.

Figure 4:
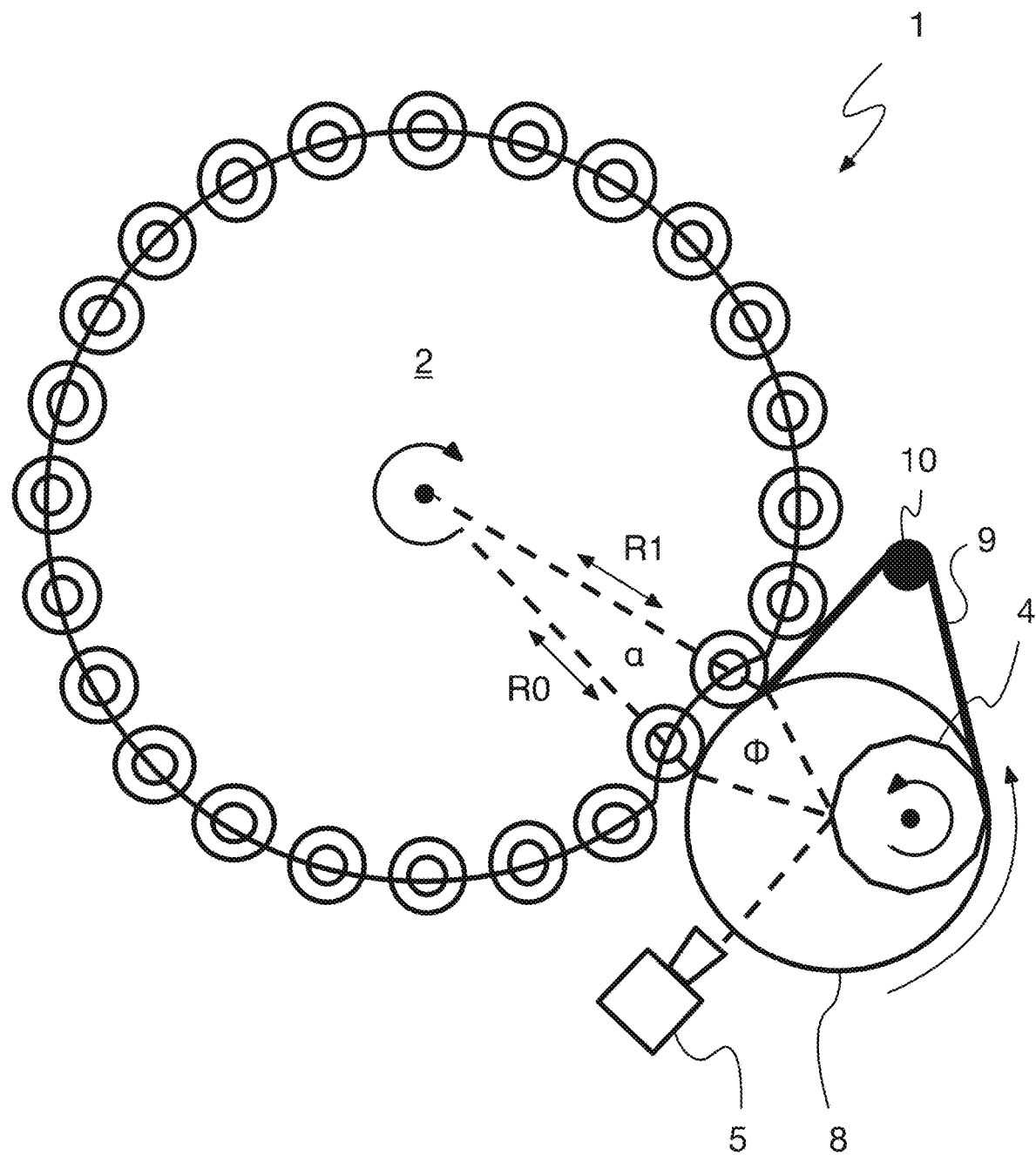
FIG. 4 is a schematic view of an inspection system in accordance with a third preferred embodiment and which is derived from the second embodiment mentioned above, in which the manipulation device is additionally provided with a belt for simultaneously causing several test objects to rotate.

In contrast to FIG. 1, here, the facet mirror 4 is shown smaller, whereby it is shown incorrectly by a polygon with only 12 sides, instead of the—actually correct—polygon with 24 sides (with M=24), purely for reasons of better recognizability (the same applies to FIG. 4). A true-to-scale representation, in particular also of the facet mirror 4, according to a possible variant of the second embodiment, can be found in FIGS. 5A and 5B. Here, the manipulation device 8 is constructed as a rotatably mounted wheel which has a drive 8a which is independent of that of the conveying structure 2 and the facet mirror 4, and which serves to rotate the manipulation wheel 8 about its axis of symmetry 8b (cf. FIGS. 5A and 5B).

The manipulation device 8 is arranged relative to the conveying structure 2 in such a way that it comes into contact with the object carriers 3 moved along its path curve and/or the test objects 6 conveyed as a result of this, as they pass through the inspection area 7. Thus, the manipulation device 8 is configured to manipulate the path curve of each object carrier 3 as they pass through the inspection area 7 of the path curve by temporarily changing the radial position of the object carrier 3 on the conveying structure 2 in such a way that, in the inspection area 7, the variation of the distance of the object carrier 3 from the axis of rotation 4a of the facet mirror 4 is at least smaller than in the case of a purely circular path curve of the object carrier 3, or even that such a variation does not take place at all. In this way, the quality, in particular the image sharpness, of the optical image can be improved. Alternatively, or in addition, an optical autofocus device (not shown) can also be provided for this purpose, in particular in the form of optical elements in the inspection device 5 itself.

Preferably, the manipulation device 8 is driven in such a way that its resulting rotational speed is selected in such a way that, as a result of this, the manipulation device causes the test objects 6 to rotate, either indirectly via the contact with the respective object carriers 3 and/or directly by direct contact, so that the test objects 6 rotate as they pass through the inspection area 7 and so that, accordingly, different portions of the lateral surface of the test object are imaged onto the inspection device 5 via the facet mirror 4. If the rotational speed of this rotation (Spin) of the test objects 6 corresponds at least to the rotational speed of the conveying structure 2 and/or the facet mirror 4, or if the circumferential speed of the manipulation device 8 is greater than that of the conveying structure 2, the lateral surface 6a of the respective test object 6 can thus be inspected over its circumference (also cf. FIG. 6). In this context, the direction of rotation of the manipulation device 8 can coincide with that of the facet mirror 4 (as shown), although a rotation in the opposite direction is also conceivable.

FIG. 4 shows a third preferred embodiment, which is derived from that shown in FIG. 3 by the fact that a belt 9, which can be a toothed belt or a flat belt, is additionally provided, which is coupled to the manipulation device 8 and is guided over a pulley 10. As part of this, the belt is arranged in such a way that it is in contact with a plurality of object carriers 3 and/or test objects 6, whereby this contact arises before the object carriers 3 or test objects 6 enter the inspection area 7 and continues, at least in part, while they pass through the latter. In this way, the test objects 6 can already be caused to rotate, indirectly via the associated object carriers 3 or directly by contact with the belt 9, before they reach the inspection area 7 on their path curve. In this way, it can be ensured that they already have a sufficiently high rotational speed and one that is as constant as possible when they enter the inspection area 7 and are then inspected there.

Figure 6:
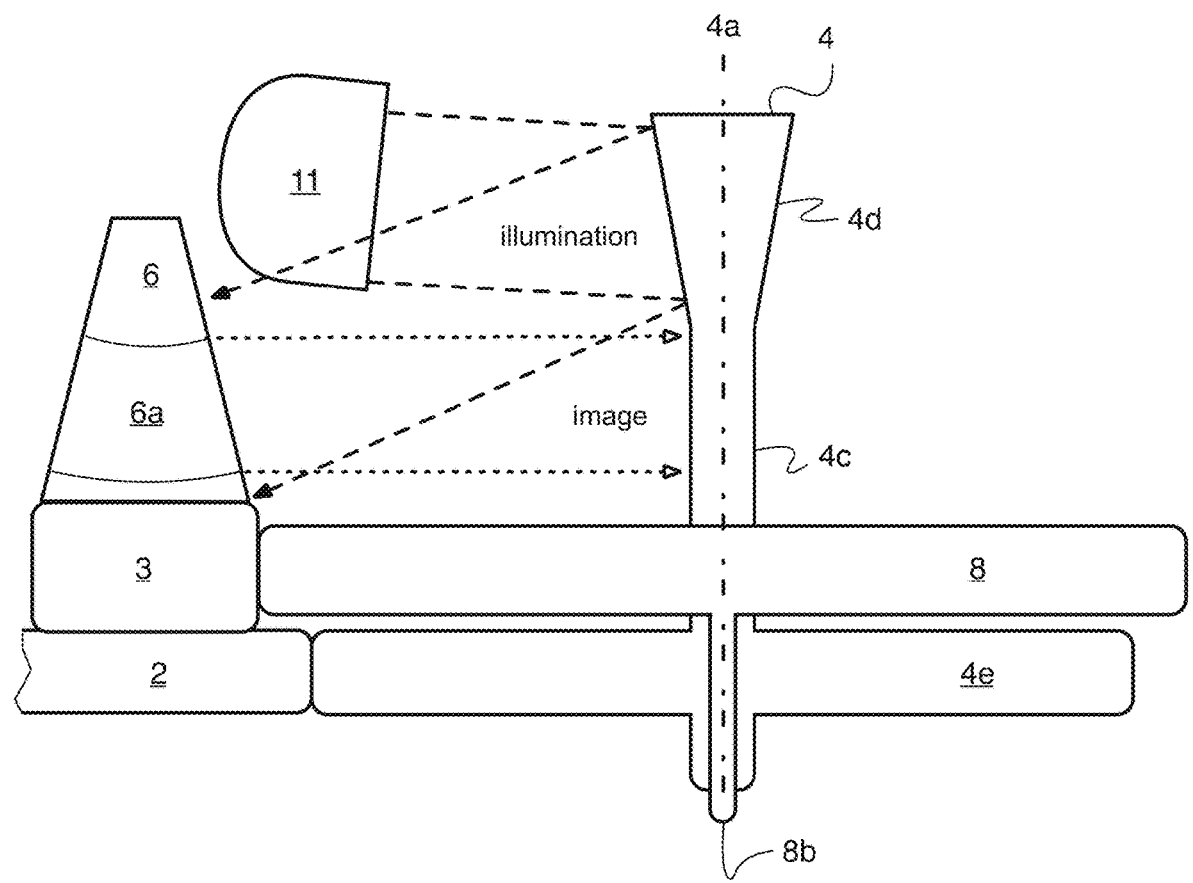
FIG. 6 shows a detailed schematic view of the inspection system of FIG. 5A, from which the indirect illumination, via the facet mirror, of a test object located in the inspection area, as well as an example of a construction of the combination of a facet mirror and a manipulation device, as well as their interaction with the object carriers of the conveying structure, can be seen.

FIGS. 5 and 6 illustrate an inspection system 1 in accordance with a fourth preferred embodiment of the invention, which is also derived from the second embodiment mentioned above, in (a) a side view as well as (b) a perspective view. In this fourth embodiment, the facet mirror is additionally set up to illuminate the inspection area on the conveying structure in cooperation with an illumination device 11, which may comprise one or more light sources. For this purpose, the facet mirror 24 comprises mirror portions or mirror regions 4c and 4d which are arranged at an angle to one another, one mirror portion 4d of which is oriented in such a way that, when it is illuminated by the illumination device 11, it reflects the light thereof, at least in part, into the inspection area 7. The other mirror portion 4c, on the other hand, is oriented in such a way that, at least in part, it images the inspection area 7 onto the inspection device 5 by reflection.

FIG. 6 illustrates this relationship in detail. The light coming from the light source 11 is reflected at the mirror portion 4d, which is inclined with respect to the axis of rotation 4a of the facet mirror 4, onto at least a portion of the lateral surface of the test object 6 held by the object carrier 3, in order to illuminate it indirectly. At the same time, an image of the illuminated lateral surface, or at least a portion 6a thereof to be inspected, is imaged onto the inspection device 5 via the further mirror portion 4c of the facet mirror 4, the mirror elements 4b of which are oriented parallel to the axis of rotation 4a, as has already been explained with reference to the preceding figures.

FIG. 6 also illustrates an example embodiment of how the coordinated rotation of the conveying structure 2 and the facet mirror 4 can be achieved. For this purpose, a drive wheel 4e is located on the facet mirror 4 at the level of the conveying structure 2, which drive wheel 4e interacts mechanically with the circumference of the conveying structure 2. In particular, both the conveying structure 2 and the drive wheel 4e can be provided with a mutually corresponding set of teeth, so that both mesh like gear wheels and are thus coupled. In particular, due to the coupling, it may be sufficient that only the conveying structure 2 or only the facet mirror 4 itself is driven since the respective other unit is also caused to rotate via this coupling. As a rule, the conveying structure 2, which is typically voluminous, will be driven.

As has been explained, in the present embodiment, the manipulation device has its own drive which enables it to be caused to rotate about an axis of rotation 8b, and to effect a rotation of the test objects 6 in an effective manner via said contact with the rotatably mounted object carriers 3 and/or the test objects 6 held by them. In this context, the contact can be effected in particular—as illustrated—by the manipulation device 8 (and/or, in the embodiment in accordance with FIG. 4, the belt 9) being pressed against the object carriers 3 located within its reach (or vice versa), wherein the object carriers 3, as is shown in FIGS. 3 and 4, are movable in the radial direction R0 and R1, respectively, but are, at the same time, supported in such a way that they are subjected to a force which acts in a radially outward direction in the direction towards the manipulation device and are thus subject to a contact pressure during the contact. In this way, the rotation of the manipulation device 8 can be transferred onto the object carriers 3 and, eventually, to the test objects 6 which are held thereby.

An inspection system in accordance with the invention, in particular in accordance with one or more of the embodiments described herein, can be used for the inspection of a lateral surface of one or more respective three-dimensional objects. In this context, the inspection can relate to a printed image produced on or at the lateral surface of the respective test object. In this way, printing or labels on test objects such as for example beverage bottles, cups, cans or other packaging can be inspected in a highly efficient manner. On the basis of the results of the inspection, a classification can then be made, for example into (i) a class of test objects 6 with proper printing and into (ii) a class of test objects 6 without printing or with defective printing. Accordingly, an inspection system in accordance with the invention can be arranged downstream of a printing device within the framework of a printing line or—more generally—of a production line, or include such a printing device.

The preceding description, in particular with respect to the functionality of the inspection system described therein, equally refers to a corresponding embodiment of the method in accordance with the invention.

While at least one example embodiment has been described above, it is to be noted that a large number of variations thereto exist. It is also to be noted that the example embodiments described herein only illustrate non-limiting examples, and that it is not intended thereby to limit the scope, the applicability, or the configuration of the devices and methods described herein. Rather, the preceding description will provide the person skilled in the art with instructions for implementing at least one example embodiment, whereby it is to be understood that various changes in the functionality and the arrangement of the elements described in an example embodiment can be made without deviating from the subject matter respectively set forth in the appended claims as well as its legal equivalents.

What is claimed is:

1. An inspection system for inspection of a lateral surface of a three-dimensional test object, wherein the inspection system comprises:

a conveying structure which is supported so as to be rotatable about a first axis of rotation the conveying structure having a plurality of N object carriers, each of which is configured as a holder for a test object to be inspected, wherein the conveying structure is configured, during a rotation, to sequentially move the object carriers through an inspection area through which passes a path section of a path curve of the object carriers which is defined by the rotation of the conveying structure;

a facet mirror which is supported so as to be rotatable about a second axis of rotation on a circumference of which facet mirror a number of M facets are provided, each of which is constructed as a mirror element, so that the mirror elements are lined up at least along a circumferential strip along the circumference of the facet mirror; and an optical inspection device which is aligned with respect to the facet mirror in such a way that the inspection area is optically imaged by the facet mirror onto the inspection device;

wherein the inspection system is arranged to rotate the conveying structure and the facet mirror in a coordinated manner and in opposite directions of rotation in such a way that each of the object carriers, as they pass through the inspection area, are imaged onto the inspection device by exactly one of the facets.

2. The inspection system according to claim 1, wherein the inspection system is set up to rotate the conveying structure and the facet mirror in a coordinated manner and in opposite directions of rotation in such a way that one of these conditions applies:
  (a) N=M, and a rotational speed of the facet mirror, at least substantially, corresponds to that of the conveying structure;
  (b) N>M, and the rotational speed of the facet mirror is smaller than that of the conveying structure;
  (c) N<M, and the rotational speed of the facet mirror is greater than that of the conveying structure.

3. The inspection system according to claim 1, wherein at least one of the object carriers is set up to hold a test object in such a way that the test object can perform a rotation at the same time.

4. The inspection system according to claim 3, wherein the at least one object carrier is set up to cause the test object held by it to rotate during the rotation of the conveying structure at a rotational speed that is greater than, or equal to, a fraction of 1/M of the rotational speed of the facet mirror.

5. The inspection system according to claim 1, wherein at least one of the object carriers is constructed as a holder for a test object constructed as a hollow body.

6. The inspection system according to claim 5, wherein the at least one of the object carriers comprises a holding mandrel for a hollow body.

7. The inspection system according to claim 1, wherein a maximum radius of the conveying structure in relation to the first axis of rotation is smaller than a smallest distance between the first axis of rotation and the circumference of the facet mirror.

8. The inspection system according to claim 1, wherein the first and the second axes of rotation are at least substantially parallel to each other.

9. The inspection system according to claim 1, wherein each of the mirror elements covers an equally large angular portion of the circumference of the facet mirror along the strip.

10. The inspection system according to claim 1, wherein at least one of the object carriers is arranged on the conveying structure so as to be movable in a radial direction and, at the same time, is subjected, at least in a path section along this radial direction, to a force which, as viewed from the first axis of rotation, acts outwardly in the radial direction.

11. The inspection system according to claim 10, wherein all of the object carriers are arranged on the conveying structure so as to be movable in the radial direction and wherein the inspection system further comprises a manipulation device which is configured to manipulate the path curve of each object carrier, as the latter passes through the inspection area of the path curve, by temporarily changing a radial position of the object carrier on the conveying structure in such a way that, in the inspection area, a variation of the distance of the object carrier from an axis of rotation of the facet mirror is at least less than in the case of a purely circular path curve of the object carrier, or is absent.

12. The inspection system according to claim 11, wherein the manipulation device is further set up to cause test objects held on the object carriers to rotate.

13. The inspection system according to claim 12, wherein the manipulation device is rotatably driven, and wherein the respective drives of the conveying structure and of the manipulation device are configured in such a way that they can set the conveying structure and the manipulation device, respectively, into a rotation in which a circumferential speed of the manipulation device is higher than that of the conveying structure.

14. The inspection system according to claim 12, wherein the manipulation device is provided with a driven belt, which is arranged next to the conveying structure in such a way that it can simultaneously engage at least two test objects which are held on respective object carriers outside the inspection area of the path curve and can cause them to rotate before they reach the inspection area on their way along the path curve defined by the rotation of the conveying structure.

15. The inspection system according to claim 1, wherein the optical inspection device comprises a line scan camera, a scan line of which is, at least substantially, parallel to an axis of rotation of the facet mirror.

16. The inspection system according to claim 1, wherein the inspection device has an autofocus function.

17. The inspection system according to claim 1, further comprising an illumination device (11) which is configured to indirectly illuminate the inspection area, or at least portions thereof, by irradiation of the facet mirror.

18. The inspection system according to claim 17, wherein at least one of the mirror elements of the facet mirror comprises two mirror portions which are arranged at an angle to each other, whereby one of the two mirror portions is oriented in such a way that, when it is illuminated by the illumination device, it reflects its light at least partially into the inspection area, while another of the two mirror portions is oriented in such a way that it images the inspection area by reflection at least partially onto the inspection device.

19. The inspection system according to claim 1, wherein the number N and/or the number M is selected from an integer range [20, . . . , 30].

20. A method for inspection of a lateral surface of a three-dimensional test object, wherein the method comprises:
  rotating a conveying structure which is supported so as to be rotatable about a first axis of rotation the conveying structure having a plurality of N object carriers, each of which is configured as a holder for a test object to be inspected, such that the object carriers are sequentially moved through an inspection area through which passes a path section of a path curve of the object carriers which is defined by a rotation of the conveying structure;

rotating a facet mirror which is supported so as to be rotatable about a second axis of rotation, on a circumference of which facet mirror a number of M facets are provided, each of which is constructed as a mirror element, so that the mirror elements are lined up at least along a circumferential strip along the circumference of the facet mirror; and inspecting, by an optical inspection device, a test object which is located on a corresponding object carrier in the inspection area, which optical inspection device is aligned with respect to the facet mirror in such a way that the inspection area is optically imaged by the latter onto the inspection device;

wherein the rotating of the conveying structure and the rotating of the facet mirror are carried out in a coordinated manner and in opposite directions of rotation in such a way that each of the object carriers, as they pass through the inspection area, are imaged onto the inspection device by exactly one of the facets.

* * * * *